US009845722B2

(12) United States Patent
Svihla et al.

(10) Patent No.: US 9,845,722 B2
(45) Date of Patent: Dec. 19, 2017

(54) ENGINE SYSTEM FOR EMISSIONS COMPLIANCE

(71) Applicant: Electro-Motive Diesel, Inc., LaGrange, IL (US)

(72) Inventors: Gary R. Svihla, Burr Ridge, IL (US); Joshua D. Schueler, New Lenox, IL (US); Steven Dallas Johnson, Naperville, IL (US); Stephen M. Bednarz, De Kalb, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 511 days.

(21) Appl. No.: 14/500,668

(22) Filed: Sep. 29, 2014

(65) Prior Publication Data
US 2016/0090902 A1    Mar. 31, 2016

(51) Int. Cl.
*F02B 37/00*    (2006.01)
*F02B 37/007*   (2006.01)
(Continued)

(52) U.S. Cl.
CPC ............ *F02B 37/007* (2013.01); *F01N 13/08* (2013.01); *F01N 13/107* (2013.01);
(Continued)

(58) Field of Classification Search
CPC .......... F02M 35/10321; F02M 35/112; F02M 35/10347; F02M 35/0144; F05C 2225/08
(Continued)

(56) References Cited

U.S. PATENT DOCUMENTS 4,179,860 A * 12/1979 Reale ............... E04C 3/08
                                                403/384
7,093,589 B2 * 8/2006 Sorersen ............. F02B 37/00
                                                123/25 A
(Continued)

FOREIGN PATENT DOCUMENTS

CN       202628334      12/2012
EP        2196659 A1     6/2010
(Continued)

OTHER PUBLICATIONS

U.S. Patent Application of Gary R. Svihla et al., entitled "Air Intake System for an Engine" filed on Sep. 29, 2014.

*Primary Examiner* — Jason C Smith
(74) *Attorney, Agent, or Firm* — Finnegan, Henderson, Farabow, Garrett & Dunner, LLP

(57) ABSTRACT

An engine system is disclosed. The engine system may have an engine having an accessory end and a drive end opposite the accessory end. The engine system may also have a turbocharger arrangement located adjacent the accessory end. The turbocharger arrangement may be configured to receive exhaust from the engine and to deliver compressed air to the air cooling arrangement. Further, the engine system may have an air cooling arrangement located adjacent the accessory end and configured to deliver fresh air to the engine. In addition, the engine system may have a mixing duct extending from the accessory end to the drive end and configured to receive the exhaust from the turbocharger arrangement. The engine system may also have an after-treatment system located adjacent the drive end. The after-treatment system may be configured to receive the exhaust from the mixing duct and to discharge the exhaust to an ambient.

18 Claims, 6 Drawing Sheets

(51) Int. Cl.
    *F01N 13/08*     (2010.01)
    *F02B 29/04*     (2006.01)
    *F01N 13/10*     (2010.01)
    *F02B 37/013*     (2006.01)
    *F01N 3/10*     (2006.01)
    *F01N 3/021*     (2006.01)
    *F01N 3/025*     (2006.01)

(52) U.S. Cl.
    CPC ........ *F02B 29/0412* (2013.01); *F02B 37/001* (2013.01); *F02B 37/004* (2013.01); *F02B 37/013* (2013.01); *F01N 3/021* (2013.01); *F01N 3/0253* (2013.01); *F01N 3/103* (2013.01); *F01N 2340/06* (2013.01); *F01N 2430/02* (2013.01); *F01N 2590/08* (2013.01); *F01N 2610/03* (2013.01); *F01N 2610/1453* (2013.01); *Y02T 10/144* (2013.01); *Y02T 10/146* (2013.01)

(58) Field of Classification Search
    USPC ..................................... 123/184.21
    See application file for complete search history.

(56) References Cited

U.S. PATENT DOCUMENTS

| | | | | |
|---|---|---|---|---|
| 7,571,608 | B2* | 8/2009 | Boyapati | F01N 3/021 |
| | | | | 123/562 |
| 8,146,359 | B2* | 4/2012 | Currie | F02B 29/0475 |
| | | | | 123/562 |
| 8,146,542 | B2* | 4/2012 | Cattani | F01P 3/12 |
| | | | | 123/41.1 |
| 8,365,527 | B2* | 2/2013 | Raab | F02M 26/28 |
| | | | | 123/41.01 |
| 8,555,637 | B2* | 10/2013 | Nakae | F17D 1/08 |
| | | | | 123/559.1 |
| 8,746,217 | B2* | 6/2014 | Piper | F02B 37/004 |
| | | | | 123/568.12 |
| 8,793,982 | B2* | 8/2014 | Patel | F01N 3/027 |
| | | | | 60/295 |
| 9,617,892 | B2* | 4/2017 | Ly | F01N 3/2066 |
| 2005/0247284 | A1* | 11/2005 | Weber | F01L 13/0015 |
| | | | | 123/299 |
| 2007/0283697 | A1* | 12/2007 | Winsor | F01N 3/023 |
| | | | | 60/605.1 |
| 2008/0041328 | A1* | 2/2008 | Granatelli | F02M 35/021 |
| | | | | 123/184.21 |
| 2008/0280715 | A1* | 11/2008 | Monden | C03C 25/1015 |
| | | | | 474/203 |
| 2009/0241868 | A1* | 10/2009 | Morita | B62K 11/04 |
| | | | | 123/54.4 |
| 2011/0029201 | A1* | 2/2011 | Holt | A01D 69/03 |
| | | | | 701/41 |
| 2013/0209291 | A1* | 8/2013 | Kitsukawa | F02B 37/013 |
| | | | | 417/410.1 |
| 2014/0041384 | A1* | 2/2014 | Mischler | F02D 41/0007 |
| | | | | 60/605.2 |
| 2014/0223892 | A1* | 8/2014 | Martinelle | F01N 3/2066 |
| | | | | 60/301 |
| 2016/0090902 | A1* | 3/2016 | Svihla | F02B 37/013 |
| | | | | 105/62.1 |
| 2016/0090948 | A1* | 3/2016 | Svihla | F02M 35/10157 |
| | | | | 105/62.1 |

FOREIGN PATENT DOCUMENTS

| | | |
|---|---|---|
| JP | 2004-257333 | 9/2004 |
| WO | WO 2013/103169 A1 | 7/2013 |
| WO | WO 2013/121962 A1 | 8/2013 |

* cited by examiner

ENGINE SYSTEM FOR EMISSIONS COMPLIANCE

TECHNICAL FIELD

The present disclosure relates generally to an engine system and, more particularly, to an engine system for emissions compliance.

BACKGROUND

Internal combustion engines generate exhaust as a by-product of fuel combustion within the engines. Engine exhaust contains, among other things, unburnt fuel, particulate matter such as soot, and harmful gases such as carbon monoxide or nitrous oxide. To comply with emissions control regulations, engine exhaust must be cleaned before discharging it into the atmosphere. Compliance with the emissions control regulations can require significant changes to existing engine air handling and exhaust after-treatment components and systems or the addition of new air handling and after-treatment components and systems.

The air handling and after-treatment components typically consume a significant volume over the top of the engine. The redesigned and/or new engine components must, however, be accommodated in the same or a smaller geometric volume available around the engine. The volumetric constraints become particularly important for engines used in locomotive or marine applications, where the available space may be further limited. The placement of engine components can also have a significant impact on engine emissions. For example, the air inlet and exhaust locations influence the overall engine configuration when considering the engine orientation as on a locomotive. Locating the exhaust outlet from an after-treatment system too close to the engine cooling radiators or the air intake filters, for example, may allow combustion by-products such as soot to foul the radiators or filter elements. Fouling of the radiators can cause the engines to run hotter, which in turn may cause increased production of harmful emissions such as nitrous oxide. Fouling of the intake air filters may similarly result in incomplete combustion leading to increased levels of unburnt hydrocarbons in the exhaust. Thus, placement of the redesigned and new engine components within the available geometric volume can present a challenge.

One attempt to address some of the problems described above is disclosed in International Patent Application Publication No. WO 2012/093200 A1 of Lundin et al. published on Jul. 12, 2012 ("the '200 publication"). In particular, the '200 publication describes an engine with a twin-turbocharger arrangement positioned at an end of the engine and supported by a common bracket. The '200 publication discloses that the high-pressure turbocharger is smaller than the low-pressure turbocharger and that the turbochargers are arranged so that their rotational axes are orthogonal to each other. Further the '200 publication discloses an intercooler located between compressor stages and a completely separate aftercooler located downstream of a second compressor stage. In addition, the '200 publication discloses that the two turbochargers and the air coolers are designed such that the size of the package is compact, and fits substantially within the width of an in-line engine.

Although the engine system of the '200 publication may include two-stage turbocharging and two-stage intake air cooling, it may still be less than optimal. In particular, because the intercooler and the aftercooler of the '200 publication are separate assemblies, a significant amount of ducting may be required to connect these assemblies to the two-stage turbochargers and other components. This extra ducting may increase costs, decrease performance of the engine, and may make it difficult to access engine components for maintenance or repair. The different sizes of the high-pressure and low-pressure turbochargers may also require unique components for maintenance and repair of each of the two turbochargers, thus increasing the cost of maintenance and repair. Moreover, the arrangement of the two turbochargers may make it difficult to access each turbocharger individually for maintenance and repair. Additionally, the large low-pressure turbocharger, the separate cooling assemblies, and the accompanying ducting may not fit in the space available for certain engine system applications.

The engine system of the present disclosure solves one or more of the problems set forth above and/or other problems of the prior art.

SUMMARY

In one aspect, the present disclosure is directed to an engine system. The engine system may include an engine having an accessory end and a drive end opposite the accessory end. The engine system may also include a turbocharger arrangement located adjacent the accessory end. The turbocharger arrangement may be configured to receive exhaust from the engine and deliver compressed air for combustion in the engine. Further, the engine system may include an air cooling arrangement located adjacent the accessory end. The air cooling arrangement may be configured to receive the compressed air from the turbocharger arrangement, cool the compressed air, and deliver the compressed air to the engine. In addition, the engine system may include a mixing duct extending from the accessory end to the drive end and configured to receive the exhaust from the turbocharger arrangement. The engine system may also include an after-treatment system located adjacent the drive end. The after-treatment system may be configured to receive the exhaust from the mixing duct, treat the exhaust, and discharge the exhaust to an ambient.

In another aspect, the present disclosure is directed to a machine. The machine may include a platform and a plurality of wheels configured to support the platform. The machine may also include an engine configured to propel the wheels. The engine may include an accessory end and a drive end opposite the accessory end. The engine may also include at least one intake manifold configured to deliver air to the engine for combustion. In addition, the engine may include at least one exhaust manifold configured to discharge exhaust produced by the combustion. The machine may also include a high-pressure turbocharger located adjacent the accessory end. The high-pressure turbocharger may include a high-pressure turbine and a high-pressure compressor. The high-pressure turbine may be configured to be propelled by exhaust from the engine and drive the high-pressure compressor. The machine may also include a first low-pressure turbocharger located adjacent the accessory end. The first low-pressure turbocharger may include a first low-pressure turbine and a first low-pressure compressor. The first low-pressure turbine may be configured to be propelled by a portion of the exhaust received from the high-pressure turbine and drive the first low-pressure compressor. The machine may also include a second low-pressure turbocharger located adjacent the accessory end. The second low-pressure turbocharger may include a second low-pressure turbine and a second low-pressure compressor.

The second low-pressure turbine may be configured to be propelled by a remaining portion of the exhaust received from the high-pressure turbine and drive the second low-pressure compressor. The machine may also include a first cooler located adjacent the accessory end. The first cooler may be configured to receive air compressed by the first low-pressure compressor and the second low-pressure compressor, cool the air, and deliver the air to the high-pressure compressor. The machine may also include a second cooler located adjacent the accessory end. The second cooler may be configured to receive the air compressed by the high-pressure compressor, cool the air, and deliver the air to the first intake manifold and the second intake manifold. The machine may also include a mixing duct extending from the accessory end to the drive end. The mixing duct may be configured to receive exhaust from the first low-pressure turbine and the second low-pressure turbine. In addition, the machine may include an after-treatment system located adjacent the drive end. The after-treatment system may be configured to receive the exhaust from the mixing duct, treat the exhaust, and discharge the exhaust to the atmosphere.

DETAILED DESCRIPTION

Figure 1:
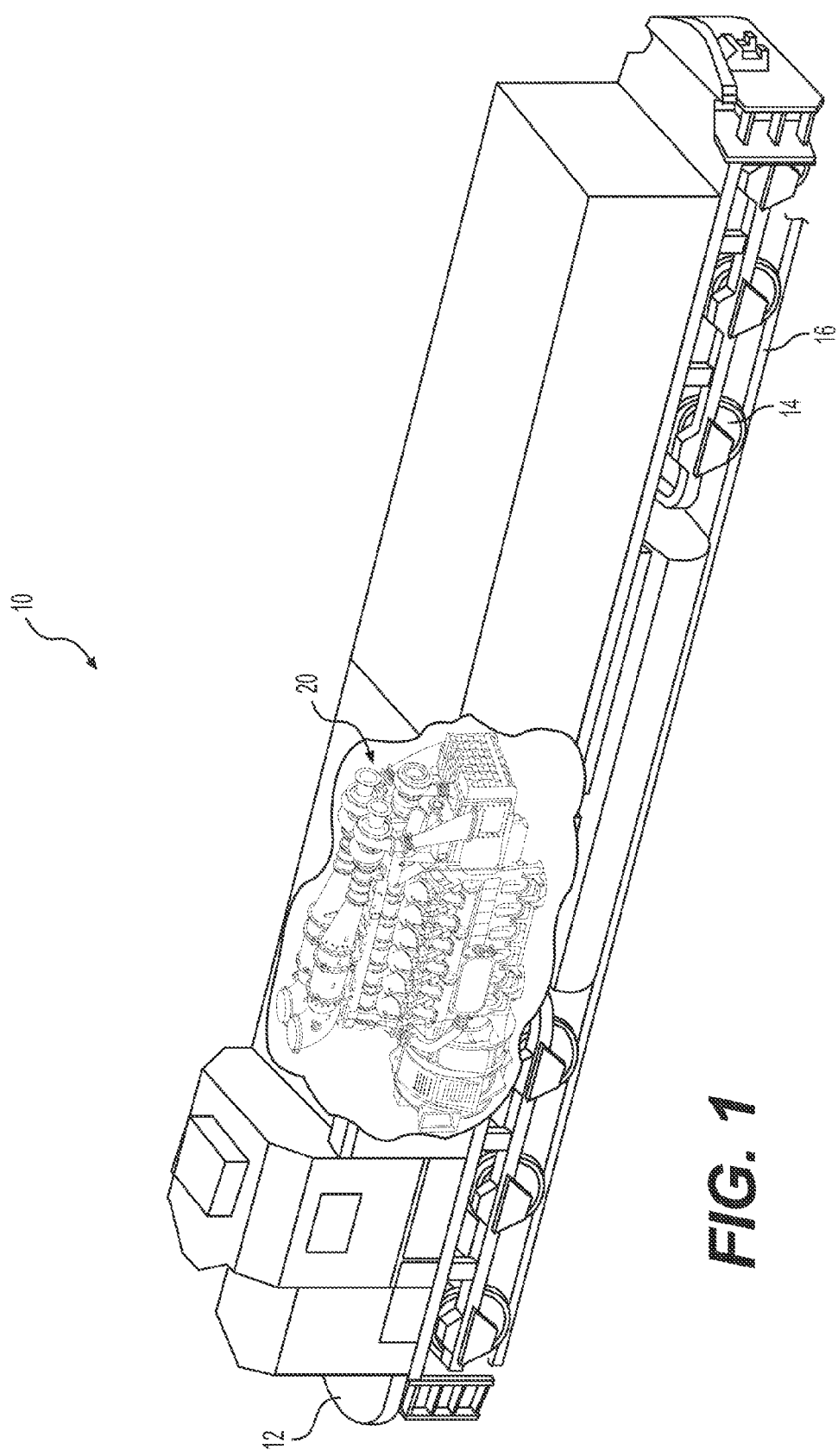
FIG. 1 is a pictorial illustration of an exemplary disclosed machine equipped with an engine system.

FIG. 1 illustrates an exemplary embodiment of a machine 10. Machine 10 may be a machine that performs some type of operation associated with an industry such as railroad, marine, power generation, mining, construction, farming, or another industry known in the art. For example, as shown in FIG. 1, machine 10 may be a locomotive designed to pull rolling stock. Machine 10 may have a platform 12 supported by a plurality of wheels 14, which may be configured to engage track 16. Wheels 14 may have traction motors (not shown) associated with them, which may drive wheels 14 to propel machine 10 in a forward or rearward direction.

Machine 10 may have an engine system 20 mounted on platform 12. In one exemplary embodiment, as shown in FIG. 1, engine system 20 may be lengthwise aligned on platform 12 along a travel direction of machine 10. One skilled in the art will recognize, however, that engine system 20 may be located in tandem, transversally, or in any other orientation on platform 12, as desired.

Figure 2:
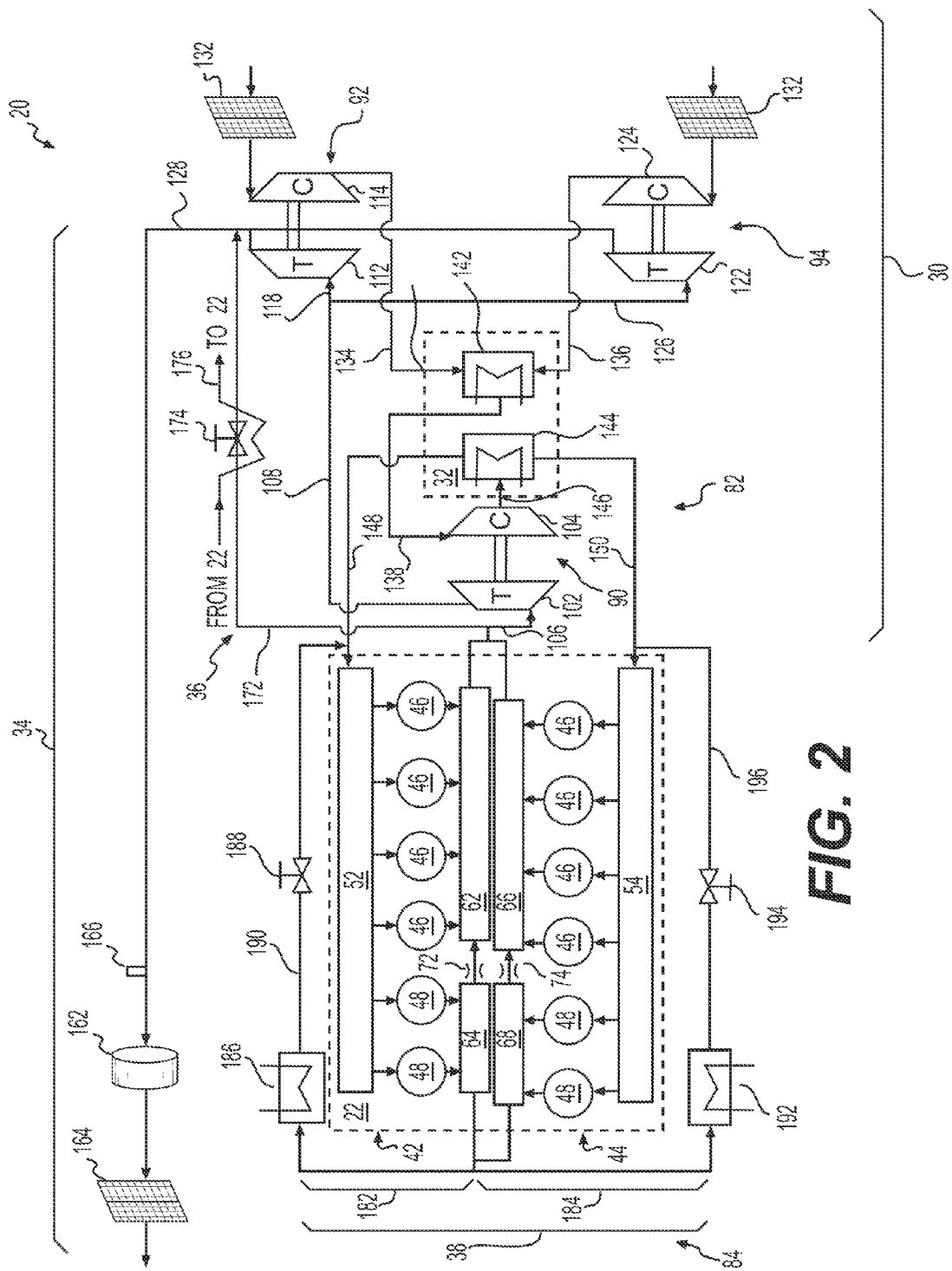
FIG. 2 is a diagrammatic view of the exemplary disclosed engine system of FIG. 1.

FIG. 2 illustrates a diagrammatic view of an exemplary embodiment of engine system 20. As shown in FIG. 2, engine system 20 may include engine 22, a turbocharger arrangement 30, an air cooling arrangement 32, an after-treatment system 34, a turbocharger bypass arrangement 36, and an exhaust gas recirculation arrangement 38. Engine 22 may be a four-stroke diesel engine. It is contemplated that engine 22 may be another type of engine, for example, a two-stroke diesel engine, a two-stroke or four-stroke gasoline engine, or a two-stroke or four-stroke gaseous-fuel-powered engine.

Engine 22 may include a first cylinder bank 42 and a second cylinder bank 44. It is contemplated, however, that engine 22 may include any number of cylinder banks 42, 44. Each of first and second cylinder banks 42, 44 may include one or more non-donor cylinders 46 and one or more donor cylinders 48. As used in this specification, an engine cylinder 48 which donates an amount of exhaust for recirculation through another cylinder 46 or 48 will be referred to as a donor cylinder 48. Exhaust generated during one combustion cycle may be recirculated from a donor cylinder 48 to cylinders 46, 48 for combustion through a second combustion cycle to ensure complete combustion of unburnt fuel and reduction of harmful exhaust gases. Exhaust from a non-donor cylinder 46 may not be recirculated through either donor cylinders 48 or non-donor cylinders 46 of engine 22. It is contemplated that each of first cylinder bank 42 and second cylinder bank 44 in engine 22 may contain only non-donor cylinders 46, only donor cylinders 48, or a combination of both non-donor cylinders 46 and donor cylinders 48. In one exemplary embodiment, first and second cylinder banks 42, 44 may be arranged in a V-configuration. It is contemplated, however, that cylinders 46, 48 of engine 22 may be arranged in an inline configuration, in an opposing-piston configuration, or in any other configuration known in the art.

Engine 22 may include first intake manifold 52 and second intake manifold 54. First intake manifold 52 may direct fresh air or a mixture of fresh air and exhaust to both donor cylinders 48 and non-donor cylinders 46 in first cylinder bank 42. Second intake manifold 54 may direct fresh air or a mixture of fresh air and exhaust to both donor cylinders 48 and non-donor cylinders 46 in second cylinder bank 44. Engine 22 may also include first exhaust manifold 62, second exhaust manifold 64, third exhaust manifold 66, fourth exhaust manifold 68, first orifice 72, and second orifice 74. First exhaust manifold 62 may receive exhaust generated by first non-donor cylinder 46 in first cylinder bank 42. Second exhaust manifold 64 may receive exhaust generated by first donor cylinder 48 in first cylinder bank 42. Third exhaust manifold 66 may receive exhaust generated by second non-donor cylinder 46 in second cylinder bank 44. Fourth exhaust manifold 68 may receive exhaust generated by second donor cylinder 48 in second cylinder bank 44. First orifice 72 may restrict a flow of exhaust between second exhaust manifold 64 and first exhaust manifold 62. Similarly, second orifice 74 may restrict a flow of exhaust between fourth exhaust manifold 68 and third exhaust manifold 66. The flow restriction resulting from first and second orifices 72, 74 may generate a manifold pressure (commonly referred to as back pressure) within second exhaust manifold 64 and fourth exhaust manifold 68, thereby helping to control an amount of exhaust flow from second and fourth exhaust manifolds 64, 68 to first and third exhaust manifolds 62, 66, respectively. Despite the back pressure, some exhaust may travel from second exhaust manifold 64 through first orifice 72 into first exhaust manifold 62. Similarly, some exhaust may travel from fourth exhaust manifold 68 through second orifice 74 into third exhaust manifold 66. It is contemplated that in some exemplary embodiments, first and second orifices 72, 74 may comprise control valves or other variable cross-sectional flow area devices known in the art to allow variable amounts of exhaust to flow from the second and fourth exhaust manifolds 64, 68 to first and third exhaust manifolds 62, 66, respectively.

Although two separate exhaust manifolds (e.g. 62, 66) associated with non-donor cylinders 46 have been described above, it is contemplated that first and third exhaust manifolds 62, 66 may be replaced by a single exhaust manifold which receives exhaust from all non-donor cylinders 46. Similarly, it is contemplated that second and fourth exhaust manifolds 64, 68 may be replaced by a single exhaust manifold associated with all donor cylinders 48. It is also contemplated that in some exemplary embodiments, there may be more than two exhaust manifolds associated with non-donor cylinders 46 and with donor cylinders 48. Further, the exhaust manifolds associated with donor cylinders 48 may be connected with exhaust manifolds associated with non-donor cylinders 46 by one or more orifices 72, 74.

Engine 22 may have an accessory end 82 and a drive end 84 opposite accessory end 82 along a longitudinal axis of engine 22. Turbocharger arrangement 30 and air cooling arrangement 32 may be located adjacent accessory end 82 of engine 22. Thus, turbocharger arrangement 30 and air cooling arrangement 32 may be located nearer to accessory end 82 relative to drive end 84. After-treatment system 34 and systems to transfer motive power from engine 22 to propel wheels 14 (see FIG. 1) of machine 10, for example, gear systems (not shown), drivetrain (not shown), etc. may be located at drive end 84 of engine 22. Thus, after-treatment system 34 may be located nearer drive end 84 relative to accessory end 82. Turbocharger arrangement 30 and air cooling arrangement 32 may cooperate to provide cooled and compressed fresh air to first and second intake manifolds 52, 54 of engine 22.

Turbocharger arrangement 30 may include a high-pressure turbocharger 90, a first low-pressure turbocharger 92, and a second low-pressure turbocharger 94. Splitting the low-pressure turbocharger stage into first and second low-pressure turbochargers 92, 94 may allow high-pressure turbocharger 90 and first and second low-pressure turbochargers 92, 94 to be of about equal size. In one exemplary embodiment, high-pressure turbocharger 90 and first and second low-pressure turbochargers 92, 94 may be of identical size. Implementing high-pressure turbocharger 90 and first and second low-pressure turbochargers 92, 94 of similar size may reduce the number of unique components required to manufacture, service, or repair high-pressure turbocharger 90 and first and second low-pressure turbochargers 92, 94. Although FIG. 2 illustrates only one high-pressure turbocharger 90, and two low-pressure turbochargers 92, 94, it is contemplated that engine system 20 may have any number of high-pressure turbochargers 90 and any number of first and second low-pressure turbochargers 92, 94.

High-pressure turbocharger 90 may include high-pressure turbine 102 and high-pressure compressor 104. High-pressure turbine 102 may receive exhaust from first and fourth exhaust manifolds 62, 68 via passageway 106. The exhaust from first and fourth exhaust manifolds 62, 68 may propel high-pressure turbine 102, which may in turn drive high-pressure compressor 104 via, for example, a common drive shaft. Exhaust may exit high-pressure turbine 102 via passageway 108. First low-pressure turbocharger 92 may include first low-pressure turbine 112 and first low-pressure compressor 114. First low-pressure turbine 112 may receive a portion of the exhaust in passageway 108, via passageway 118. Exhaust received from passageway 118 may propel first low-pressure turbine 112, which may in turn drive first low-pressure compressor 114 via, for example, a common drive shaft. Second low-pressure turbocharger 94 may include second low-pressure turbine 122 and second low-pressure compressor 124. Second low-pressure turbine 122 may receive a remaining portion of the exhaust from passageway 108 via passageway 126. Exhaust received from passageway 126 may propel second low-pressure turbine 122, which may in turn drive second low-pressure compressor 124 via, for example, a common drive shaft. Exhaust from first and second low-pressure turbines 112, 122 may be directed to after-treatment system 34 via passageway 128.

First and second low-pressure compressors 114, 124 may draw fresh air through corresponding filters 132, compress the air to a first pressure level, and direct the pressurized air to passageways 134, 136, respectively. Compressed air in passageways 134, 136 may be cooled in air cooling arrangement 32. High-pressure compressor 104 may receive the pressurized air from air cooling arrangement 32 via passageway 138 and increase the pressure of the air to a higher level. It is contemplated that high-pressure and low-pressure may be relative terms and do not denote specific pressures. In one exemplary embodiment, high-pressure compressor 104 may compress air to a pressure level that is about two to five times the pressure level of the air compressed by low-pressure compressors 114, 124. Each of high-pressure compressor 104, and first and second low-pressure compressors 114, 124 may embody a fixed geometry compressor, a variable geometry compressor, or any other type of compressor configured to receive air and compress the air to a desired pressure level.

Air cooling arrangement 32 may include a first cooler 142 and a second cooler 144. First cooler 142, also known as an inter-stage cooler 142 or an intercooler 142 may be located in fluid communication with passageways 134, 136 to chill the air pressurized by first and second low-pressure compressors 114, 124. Chilled air from first cooler 142 may be delivered to high-pressure compressor 104 via passageway 138. Second cooler 144, also known as an after-cooler 144, may be disposed downstream of high-pressure compressor 104 (e.g., between high-pressure compressor 104 and first and second intake manifolds 52, 54) to further chill the air before it enters first and second intake manifolds 52, 54 of engine 22. Second cooler 144 may receive compressed air from high-pressure compressor 104 via passageway 146. Chilled air from second cooler 144 may enter first and second intake manifolds 52, 54 via passageways 148, 150, respectively.

First and second coolers 142, 144 may embody air-to-air heat exchangers, liquid-to-air heat exchangers, or combinations of both, and may be configured to facilitate the transfer of thermal energy away from the compressed air passing through first and second coolers 142, 144. The thermal energy transferred away from the compressed air may be absorbed into a flow of coolant, for example air, glycol, water, a water/glycol mixture, a blended air mixture, or another coolant known in the art. The coolant may be circulated through first and second coolers 142, 144 via a separate coolant loop (not shown) and pump (not shown).

After-treatment system 34 may receive exhaust from first and second low-pressure turbines 112, 122 via passageway 128, which may extend from accessory end 82 to drive end 84. After-treatment system 34 may treat the exhaust before discharging the exhaust into an ambient. After-treatment system 34 may include one or more diesel oxidation catalysts (DOC) 162, one or more diesel particulate filters (DPF) 164, and one or more dosers 166. DOC 162 may be located upstream from DPF 164 so that exhaust in passageway 128 may pass through DOC 162 before passing through DPF 164. DPF 164 may trap particulate matter, for example, soot in the exhaust flowing in passageway 128. When DOC 162 reaches an activation (or light-off) temperature, nitrous oxide flowing through passageway 128 may interact with the soot trapped in DPF 164 to oxidize some or all of the soot trapped in DPF 164. One or more dosers 166 may be disposed upstream from DOCs 162. Dosers 166 may inject fuel into the exhaust flowing in passageway 128. The injected fuel may mix with the exhaust before the exhaust reaches DOC 162 and DPF 164. The fuel injected by dosers 166 may be the same fuel that is used by engine 22 or may be any other type of fuel that can be oxidized to produce heat, which may be used to heat up DOC 162 to its activation temperature and/or to oxidize the particulate matter trapped in DPF 164. One skilled in the art would recognize that other types of after-treatment devices known in the art may be included in after-treatment system 34 of engine system 20 in addition to or as an alternative to DOCs 162, DPFs 164, and dosers 166.

DOC 162, may include a flow-through substrate having, for example, a honeycomb structure or any other equivalent structure with many parallel channels for exhaust to flow through. The honeycomb or other structure of the substrate in DOC 162 may increase the contact area of the substrate to exhaust, allowing more of the undesirable constituents to be oxidized as exhaust in passageway 128 passes through DOC 162. A catalytic coating (for example, of a platinum group metal) may be applied to the surface of the substrate to promote oxidation of some constituents (such as, for example, hydrocarbons, carbon monoxide, oxides of nitrogen, etc.) of exhaust as it flows through DOC 162.

DPF 164 may be a device used to physically separate particulate matter such as soot from the exhaust in passageway 128. DPF 164 may include a wall-flow substrate. In one exemplary embodiment, DPF 164 may include a flow-through arrangement. Exhaust may pass through walls of DPF 164, leaving larger particulate matter accumulated on the walls. It is contemplated that DPF 164 may be a filter, wire mesh screen, or may have any other suitable configuration known in the art for trapping soot particles. As is known in the art, DPF 164 may be regenerated periodically to clear the accumulated particulate matter. Additionally or alternatively, DPF 164 may be removed from engine system 20 and cleaned or replaced during routine maintenance. Although FIG. 2 illustrates one after-treatment system 34 that receives exhaust from both first and second low-pressure turbines 112, 122, it is contemplated that engine system 20 may include separate after-treatment systems 34 to treat exhaust from first and second low-pressure turbines 112, 122.

Engine system 20 may also include turbocharger bypass arrangement 36. Turbocharger bypass arrangement 36 may include one or more passageways 172, which may direct a portion of the exhaust from first and third exhaust manifolds 62, 66 to passageway 128. In this manner, passageway 172 may allow the portion of the exhaust to bypass high-pressure turbocharger 90 and first and second low-pressure turbochargers 92, 94. A control valve 174 may be disposed in passageway 172. Control valve 174 may be configured to selectively direct the portion of exhaust flow from the first and third exhaust manifolds 62, 66 to after-treatment system 34 via passageway 172.

Control valve 174 may be a two position or proportional type valve having a valve element movable to regulate a flow of exhaust through passageway 172. The valve element in control valve 174 may be hydraulic, pneumatic, solenoid-operable, or electro-mechanically operable to move between a flow-passing position and a flow-blocking position. It is also contemplated that the valve element in control valve 174 may be operable in any other manner known in the art. In the flow-passing position, control valve 174 may permit exhaust to flow through passageway 172 substantially unrestricted by control valve 174. In contrast, in the flow-blocking position, control valve 174 may completely block exhaust from flowing through passageway 172. Control valve 174 may be cooled via liquid coolant from engine 22. Liquid coolant passageway 176 may be placed directly adjacent to control valve 174 to minimize the piping required to cool control valve 174.

Engine system 20 may also include exhaust gas recirculation (EGR) arrangement 38. EGR arrangement 38 may include first EGR circuit 182 and second EGR circuit 184. First EGR circuit 182 may include first EGR cooler 186 and first EGR control valve 188. First EGR control valve 188 may regulate a flow of exhaust in passageway 190 of first EGR circuit 182. For example, first EGR control valve 188 may selectively direct a first amount of exhaust from second exhaust manifold 64 to flow via passageway 190 to first intake manifold 52. First EGR cooler 186 may cool the first amount of exhaust, which may mix with fresh air supplied by high-pressure compressor 104 via passageway 148 before entering first intake manifold 52. The mixture of air and the first amount of exhaust may enter first intake manifold 52, which may direct the mixture into non-donor cylinders 46 and donor cylinders 48 of first cylinder bank 42.

Second EGR circuit 184 may include second EGR cooler 192 and second EGR control valve 194. Second EGR control valve 194 may regulate a flow of exhaust in passageway 196 of second EGR circuit 184. For example, second EGR control valve 194 may selectively direct a second amount of exhaust from fourth exhaust manifold 68 to flow via passageway 196 to second intake manifold 54. Second EGR cooler 192 may cool the second amount of exhaust, which may mix with fresh air supplied by high-pressure compressor 104 via passageway 150 before entering second intake manifold 54. The mixture of air and the second amount of exhaust may enter second intake manifold 54, which may direct the mixture into non-donor cylinders 46 and donor cylinders 48 of second cylinder bank 44. Although FIG. 2 depicts first and second EGR control valves 188, 194 located after first and second EGR coolers 186, 192, respectively, it is contemplated that first and second EGR control valves 188, 194 may be located anywhere in first and second EGR circuits 182, 184, respectively. It is also contemplated that first and second EGR circuits 182, 184 may include any number of first and second EGR coolers 186, 192 and first and second EGR control valves 188, 194. First and second EGR control valves 188, 194 may have a structure and function similar to that described above for control valve 174. First and second EGR coolers 186, 192 may have a structure and function similar to that described above for first and second coolers 142, 144.

Figure 3:
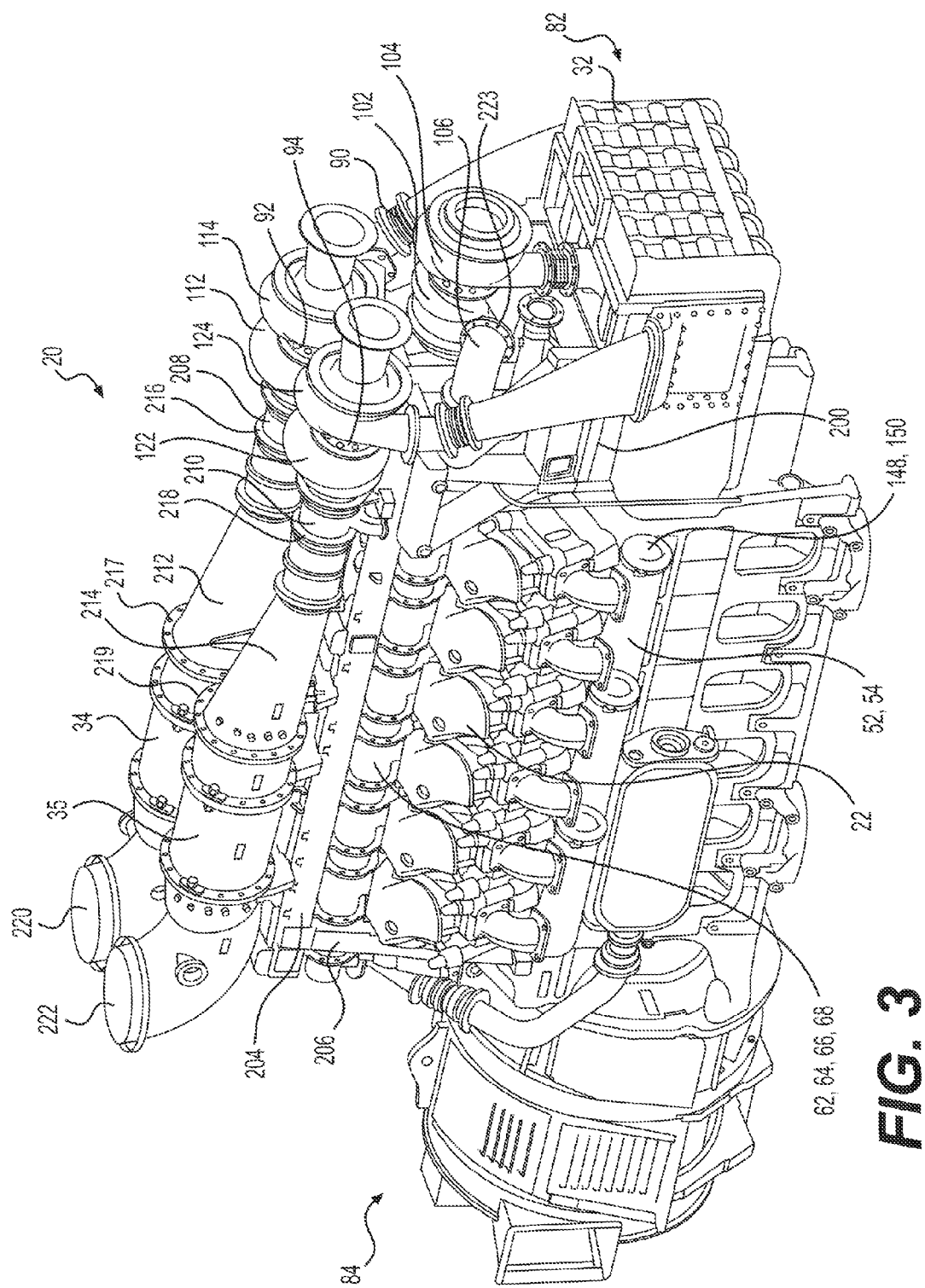
FIG. 3 is an isometric view of an exemplary arrangement of components of the engine system of FIG. 2.

FIG. 3 illustrates an isometric view of an exemplary engine system 20. As shown in FIG. 3, high-pressure turbocharger 90, first and second low-pressure turbochargers 92, 94, and air cooling arrangement 32 are located at accessory end 82 of engine 22. Locating these components at accessory end 82 of engine 22 may minimize an amount of ducting required to allow exhaust from engine 22 to be directed to high-pressure turbocharger 90, first and second low-pressure turbochargers 92, 94 for engine system 20. The disclosed arrangement of these components may also help minimize an amount of ducting required to allow fresh air to be directed to first and second intake manifolds 52, 54 (not visible) by locating air cooling arrangement 32 such that passageways 148, 150 (not visible) from air cooling arrangement 32 may be located closest to first and second intake manifolds 52, 54.

As further illustrated in FIG. 3, high-pressure turbocharger 90 and first and second low-pressure turbochargers 92, 94 may be attached to a support structure 200, which may be attached to engine 22. Further, as shown in FIG. 3, first and second low-pressure turbochargers 92, 94 may be disposed at a gravitationally higher position than high-pressure turbocharger 90. High-pressure turbocharger 90, in turn, may be disposed at a gravitationally higher position than air cooling arrangement 32. Additionally, high-pressure turbocharger 90 may be located at a length-wise center of air cooling arrangement 32, with first and second low-pressure turbochargers 92, 94 disposed on either side of high-pressure turbocharger 90. Although FIG. 3 illustrates one exemplary geometric arrangement of high-pressure turbocharger 90, first and second low-pressure turbochargers 92, 94, and air cooling arrangement 32, it is contemplated that these components may be arranged in any other order or relative gravitational position. For example, high-pressure turbocharger 90 and first and second low-pressure turbochargers 92, 94 may be disposed at the same gravitational location relative to air cooling arrangement 32. It is also contemplated that high-pressure turbocharger 90 and first and second low-pressure turbochargers 92, 94 may be attached to air cooling arrangement 32 instead of being attached to support structure 200.

An elbow 202 (see FIG. 5) may split exhaust flow exiting high-pressure turbine 102 into two exhaust streams, which may be delivered to first and second low-pressure turbines via passageways 118, 126 (see FIG. 5), respectively. In one exemplary embodiment, elbow 202 may be configured to split exhaust exiting high-pressure turbine into two exhaust streams having an approximately equal flow rate. The relative locations of high-pressure turbo-charger 92, first and second low-pressure turbochargers 94, 96, and air cooling arrangement 32 may provide a configuration having reduced external ducting, thereby lowering cost and an overall package size of engine system 20. For example, by locating the first and second low-pressure turbochargers in close proximity with high-pressure turbocharger 90, lengths of elbow 202 and passageways 118, 126 may be significantly reduced. Further, the reduced lengths may reduce an amount of pressure loss in the exhaust flowing from high-pressure turbocharger 90 to first and second low-pressure turbochargers 92, 94. In addition, the arrangement of high-pressure turbocharger 90 and first and second low-pressure turbochargers 92, 94 may allow for ease of installation and maintenance, and may minimize vibrations induced in high-pressure turbocharger 92 and first and second low-pressure turbochargers 94, 96 because of operation of engine 22.

FIG. 3 also illustrates after-treatment systems 34, 35 located adjacent to drive end 84 of engine 22. After-treatment systems 34, 35 may be supported by support structure 200 via a cantilevered frame 204, which may be attached to engine 22 using support members 206 adjacent to drive end 84. Treatment of exhaust gases using DOCs 162 (see FIG. 2) in after-treatment systems 34, 35 may require a relatively long distance between first and second outlets 208, 210 of first and second low-pressure turbochargers 94, 96, respectively, and face(s) of DOCs 162. A longer path leading to faces of DOCs 162 allows both good diffusion and gas/hydrocarbon mixing. Moreover, performance of DOCs 162 depends upon maintaining a uniform mass flow distribution across all incoming surface areas of DOCs 162, particularly when after-treatment systems 34, 35 employ dosers 166 (see FIG. 2) to provide additional hydrocarbon input to raise gas temperatures of the exhaust in after-treatment systems 34, 35. As shown in FIG. 3, exhaust exiting first low-pressure turbocharger 92 may enter mixing duct 212, which may deliver the exhaust to after-treatment system 34. Exhaust exiting second low-pressure turbocharger 94 may enter mixing duct 214, which may deliver the exhaust to after-treatment system 35. In one exemplary embodiment, mixing ducts 212, 214 may have a conical shape. Mixing ducts 212, 214 may be disposed over the center of engine 22 along a longitudinal axis of engine 22. Mixing duct 212 may have a first end 216 connected to first outlet 208 of first low-pressure turbine 112 and a second end 217 connected to after-treatment system 34. Mixing duct 214 may have a first end 218 connected to second outlet 210 of second low-pressure turbine 122 and a second end 219 connected to after-treatment system 35. After-treatment systems 34, 35 may treat the exhaust received from turbocharger arrangement 30 before releasing the exhaust to an ambient via outlets 220, 222, respectively As shown in FIG. 3, directing exhaust gases via mixing ducts 212, 214 located at the top of engine 22 may cause a temperature of air surrounding mixing ducts 212, 214 to be relatively higher compared to a temperature of air surrounding air cooling arrangement 32. To minimize heating of the air entering engine 22, first and second intake manifolds 52, 54 may be located at a gravitationally lower position compared to first, second, third, and fourth exhaust manifolds 62, 64, 66, 68. Locating exhaust manifolds 62, 64, 66, 68 at a gravitationally higher position may also advantageously reduce the amount of ducting required to deliver the exhaust from exhaust manifolds 62, 64, 66, 68 to high-pressure turbine 102. For example, as shown in FIG. 3, a length of passageway 106 may be reduced by placing an inlet 223 of high-pressure turbine 102 in close proximity to exhaust manifolds 62, 64, 66, 68.

Figure 4:
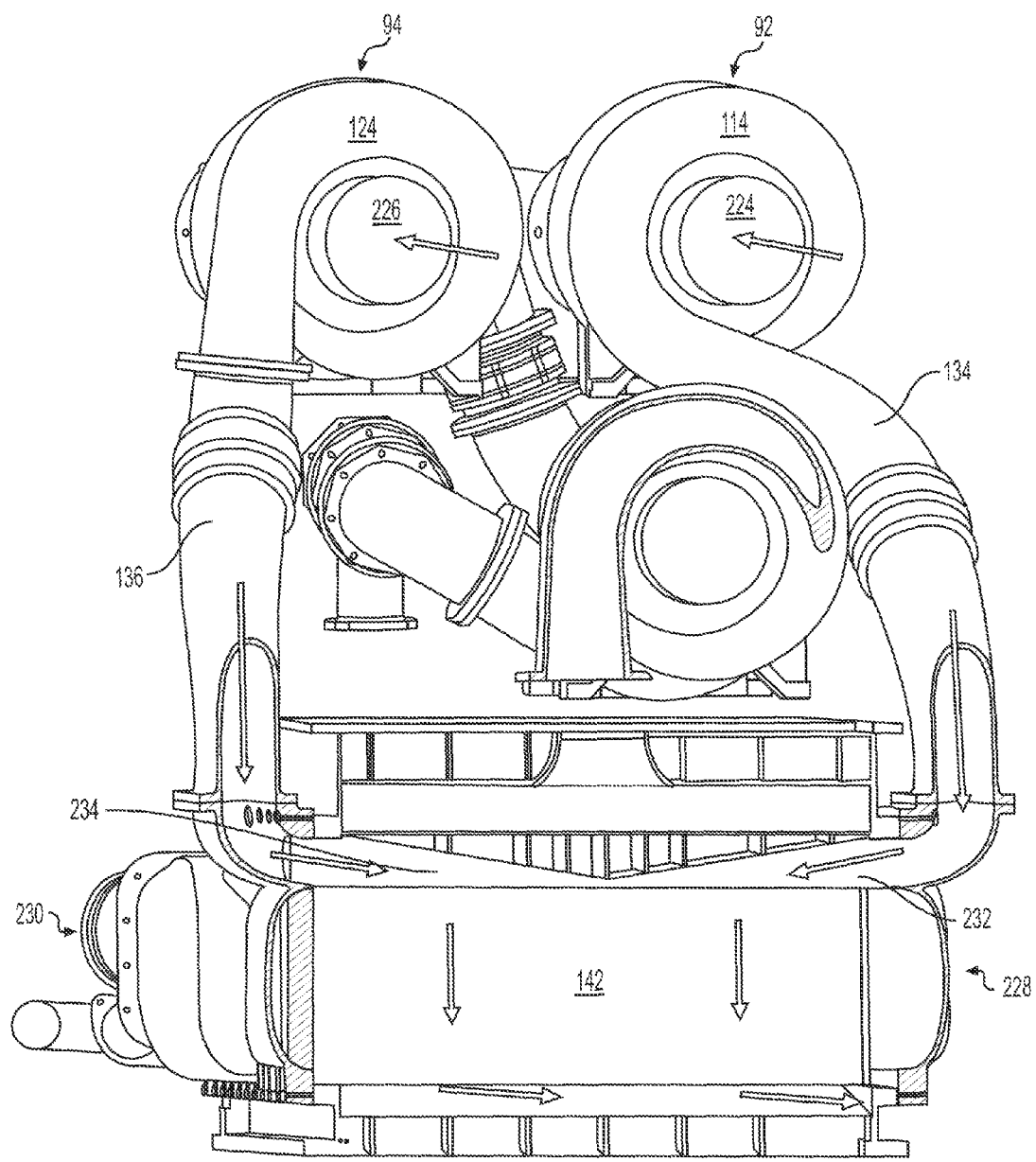
FIG. 4 is a cut-away view illustrating the air flow through exemplary disclosed turbochargers and an intercooler of the engine system FIG. 2.

FIG. 4 illustrates a cut-away view showing the air flow through first and second low-pressure compressors 114, 124, and first cooler 142 of engine system 20. As illustrated in FIG. 4, fresh air may enter first and second low-pressure compressors 114, 124 via first and second inlets 224, 226, respectively. First and second low-pressure compressors 114, 124 may compress the air to a first pressure level and deliver the compressed air via first and second passageways 134, 136, respectively to first cooler 142. In the embodiment illustrated in FIG. 4, first passageway 134 is disposed on a first side 228 of first cooler 142 and second passageway 136 is disposed on a second side 230, opposite the first side 228, of first cooler 142. As also illustrated in FIG. 4, first and second low-pressure turbochargers 92, 94 and passageways 134, 136 may be disposed at locations that are gravitationally higher than first cooler 142. Air from passageways 134, 136 may flow in opposing directions via passageways 232, 234 into first cooler 142. One of ordinary skill in the art would recognize that delivering compressed air to first cooler 142 in this manner may promote mixing of air flowing through passageways 134, 136 and help ensure that air flow within first cooler 142 is uniform, which in turn may make the cooling process more efficient. It is contemplated, however, that passageways 134, 136 may be located elsewhere around first cooler 142. It is also contemplated that passageways 134, 136 may merge into a single passageway outside first cooler 142. As further illustrated in FIG. 4, air chilled by first cooler 142 may exit first cooler 142 in a direction that may be generally orthogonal to a direction in which air enters first cooler 142. In FIG. 4, for example, chilled air may exit first cooler 142 in a direction generally orthogonal to and outward from the page.

Figure 5:
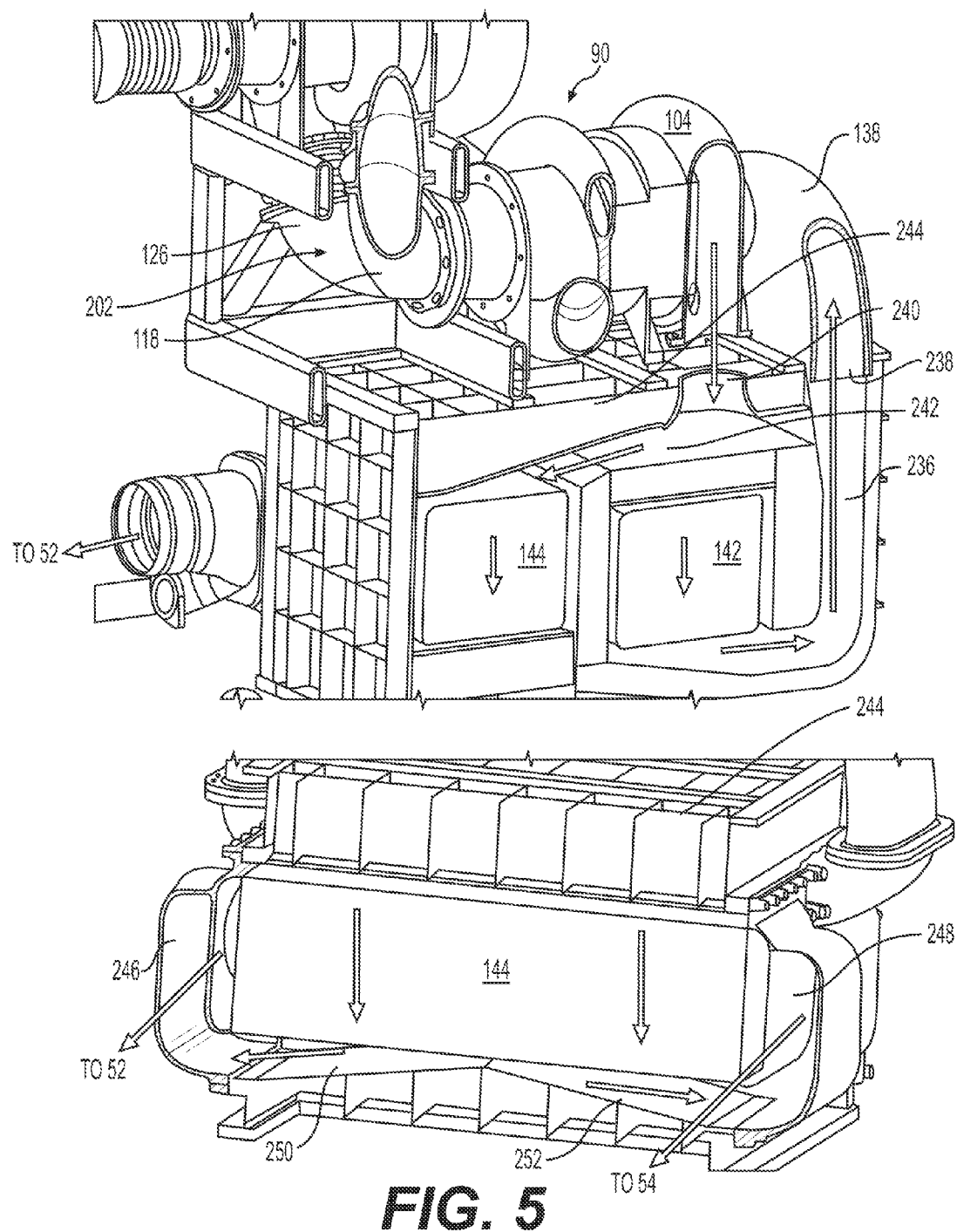
FIG. 5 is another cut-away view illustrating the air flow through the exemplary disclosed turbochargers and an aftercooler of the engine system of FIG. 2.

FIG. 5 illustrates another cut-away view showing the air flow through high-pressure turbocharger 90, first cooler 142, and second cooler 144. As illustrated in FIG. 5, chilled air may exit first cooler 142 via a compact duct 236 in a direction opposite to a direction of air flow through first cooler 142. Air may exit compact duct 236 via outlet 238 and may enter high-pressure compressor 104 via passageway 138. Compressed air from high-pressure compressor 104 may enter air cooling arrangement 32 via inlet 240. Within air cooling arrangement 32, air may flow to second cooler 144 via passageway 242. As illustrated in FIG. 5, inlet 240 and outlet 238 may be located on an upper wall 244 of air cooling arrangement 32. Second cooler 144 may chill the air received from high-pressure compressor 104 and may deliver the chilled air to first and second plenums 246, 248. As illustrated in FIG. 5, air may flow out of second cooler 144 via passageways 250, 252 to first and second plenums 246, 248, respectively. Further, as illustrated in FIG. 5, a direction of air flow in passageway 250 may be opposite to a direction of air flow in passageway 252. As also illustrated in FIG. 5, air may flow out of first and second plenums 246, 248, in a direction generally orthogonal to the direction in which air flows through second cooler 144. First and second plenums 246, 248 may deliver the cooled and compressed air received from second cooler 144 to first and second intake manifolds 52, 54, respectively. One of ordinary skill in the art would recognize from the configurations illustrated in FIGS. 4 and 5, that locating the high-pressure turbocharger 90, first and second low-pressure turbochargers 92, 94, and first and second coolers 142, 144 in close proximity adjacent to accessory end 82 of engine 22 may help reduce the amount of ducting needed to allow air to flow between the various components. Reduced ducting in turn may not only reduce the cost of manufacturing but may also help reduce pressure losses in engine system 20, which in turn may help improve the combustion characteristics of engine 22 and help to reduce emissions from engine 22.

Figure 6:
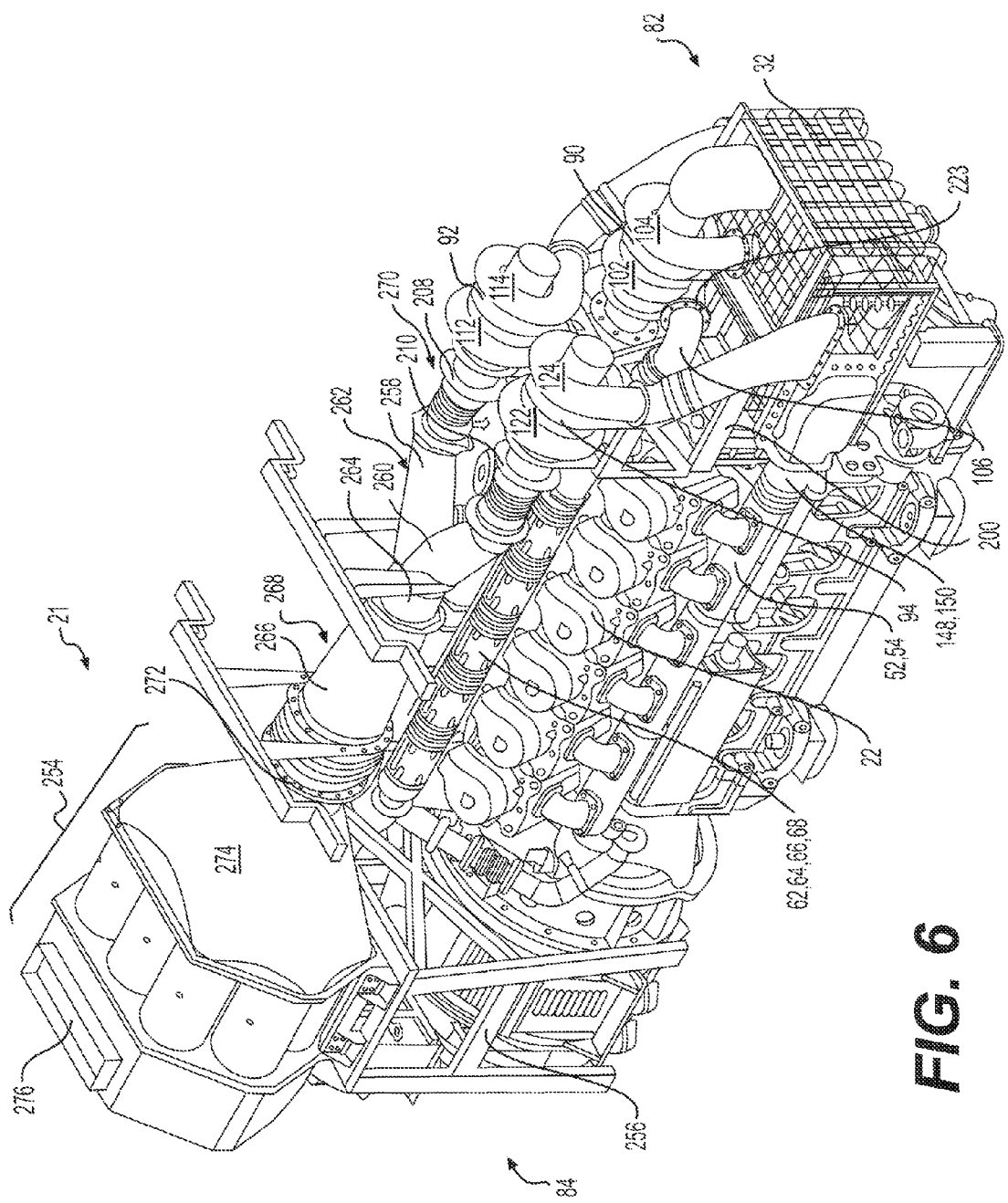
FIG. 6 is an isometric view of another exemplary arrangement of components of the engine system of FIG. 2.

FIG. 6 illustrates an isometric view of an exemplary engine system 21. Many of the components of engine system 21 are similar to those described above with respect to engine system 20. Only components of engine system 21 that may have structures or functions different from one or more components of engine system 20 are described below. Unlike engine system 20, engine system 21 may include one after-treatment system 254, which may receive exhaust from both first and second low-pressure turbines 112, 122. After-treatment system 254 of engine system 21 may be attached to alternator structure 256 located at drive end 84 of engine 22. Alternator structure 256 may support various components, for example, one or more alternators (not shown), which may be driven by engine 22 to generate electricity to drive the traction motors (not shown) to propel wheels 14 (see FIG. 1) of machine 10 (see FIG. 1). Treatment of exhaust gases using DOC 162 (see FIG. 2) in after-treatment system 254 may require a relatively long distance between first and second outlets 208, 210 of first and second low-pressure turbochargers 94, 96, respectively, and face(s) of DOC 162. A longer path leading to faces of DOC 162 allows both good diffusion and gas/hydrocarbon mixing. Moreover, performance of DOC 162 depends upon maintaining a uniform mass flow distribution across all incoming surface areas of DOC 162, particularly when after-treatment system 254 employs dosers 166 (see FIG. 2) to provide additional hydrocarbon input to raise gas temperatures of the exhaust in after-treatment system 34. As shown in FIG. 6, exhaust exiting first and second low-pressure turbochargers 94, 96 from first and second outlets 208, 210 may enter first and second legs 258, 260, respectively of adapter 262 and may exit adapter 262 via third leg 264. A duct 266 may receive exhaust from adapter 262 and deliver the exhaust to after-treatment system 254. In one exemplary embodiment, duct 266 may have a conical shape. Adapter 262 and duct 266 may comprise a mixing duct 268. As illustrated in the embodiment shown in FIG. 6, mixing duct 268 may be disposed over the center of engine 22 along a longitudinal axis of engine 22. Mixing duct 268 may have a first end 270 connected to first and second outlets 208, 210 of first and second low-pressure turbines 112, 122, respectively, and a second end 272 connected to a transition duct 274. Transition duct 274 may connect mixing duct 268 to after-treatment system 254, which may treat the exhaust received from turbocharger arrangement 30 before releasing the exhaust to an ambient via outlet 276.

As shown in FIG. 6, directing exhaust gases via mixing duct 268 located at the top of engine 22 may cause a temperature of air surrounding mixing duct 268 to be relatively higher compared to a temperature of air surrounding air cooling arrangement 32. To minimize heating of the air entering engine 22, first and second intake manifolds 52, 54 may be located at a gravitationally lower position compared to first, second, third, and fourth exhaust manifolds 62, 64, 66, 68. Locating exhaust manifolds 62, 64, 66, 68 at a gravitationally higher position may also advantageously reduce the amount of ducting required to deliver the exhaust from exhaust manifolds 62, 64, 66, 68 to high-pressure turbine 102. For example, as shown in FIG. 6, a length of passageway 106 may be reduced by placing an inlet 227 of high-pressure turbine 102 in close proximity to exhaust manifolds 62, 64, 66, 68.

INDUSTRIAL APPLICABILITY

The disclosed engine system 20 may be implemented into any power system application which must comply with stringent emissions control regulations while being packaged in a limited amount of volume available to accommodate engine system 20. The disclosed engine system 20 may be simple and robust, and offer enhanced application opportunities because of its compact size and improved serviceability. In particular, locating high-pressure turbocharger 90, first and second low-pressure turbochargers 92, 94, and first and second coolers, 142, 144 adjacent to accessory end 82 of engine 22 may reduce an overall packaging size of turbocharger arrangement 30 and air cooling arrangement 32. First and second coolers 142, 144 may also be substantially isolated from each other, allowing for different pressures, temperatures, and flow rates between first and second coolers 142, 144.

In addition, the ducting configuration of high-pressure turbocharger 90 and first and second low-pressure turbochargers 92, 94 in relation to first and second coolers 142, 144 may further reduce the overall packaging size of turbocharger arrangement 30 and air cooling arrangement 32, while still maintaining the necessary performance and efficiency. For example, high-pressure turbocharger 90 and first and second low-pressure turbochargers 92, 94 and first and second coolers 142, 144 may be positioned at different gravitational heights in order to reduce external ducting and costs associated with the extra ducting. High-pressure turbocharger 90 and first and second low-pressure turbochargers 92, 94 may also be at least partially supported by support structure 200, which may be attached to first and second coolers 142, 144, and/or engine 22, thereby reducing a need for additional support structures. The modular arrangement of high-pressure turbocharger 90, first and second low-pressure turbochargers 92, 94, and first and second coolers 142, 144 may also allow easy access to these components for maintenance and/or repair.

Referring to FIGS. 2 and 4, air may be drawn into first and second low-pressure compressors 114, 124 and be compressed to a first pressure level. The pressurized air may exit first and second compressors 114, 124, and may be directed in a downward direction towards first cooler 142 via passageways 134, 136, respectively.

Referring to FIG. 4, after passing through passageways 134, 136, the pressurized air may be redirected towards first cooler 142 in two separate flow streams flowing towards each other via passageways 232, 234, respectively. The pressurized air may then travel through air channels of first cooler 142 in a generally downward direction. As the pressurized air flows through first cooler 142, coolant flowing through first cooler 142 may absorb thermal energy from the pressurized air thereby helping to reduce a temperature of the air.

Referring to FIG. 5, after flowing through first cooler 142, cooled air may be redirected in an upward direction through compact duct 236 towards outlet 238. Air may be drawn into high-pressure compressor 104 from first cooler 142 via passageway 138. High-pressure compressor 104 may compress the cooled air to a second pressure level that is greater than the first pressure level and redirect the pressurized air back in a downward direction towards second cooler 144.

The pressurized air from high-pressure compressor 104 may flow through inlet 240, where it may be redirected towards second cooler 144 via passageway 242. As the pressurized air flows through second cooler 144, coolant flowing through second cooler 144 may absorb thermal energy from the pressurized air thereby helping to reduce a temperature of the air. The pressurized air may flow through air channels of second cooler 144 in a generally downward direction. After exiting second cooler 144, the cooled air may be divided into two substantially equal flow streams. The two flow streams may flow through passageways 250, 252 away from each other in generally opposite directions towards first and second plenums 246, 248, respectively. Cooled and compressed air from second cooler 144 may exit via first and second plenums 246, 248, which may direct the air first and second intake manifolds 52, 54 of engine 22 for combustion.

Referring to FIG. 2, combustion in engine 22 may produce exhaust which may exit engine 22 and enter high-pressure turbocharger 90 via passageway 106. The exhaust entering high-pressure turbocharger 90 may propel high-pressure turbine 102, which may drive high-pressure compressor 104. Exhaust exiting high-pressure turbine 102 may be split into two substantially equal exhaust streams, which may enter first and second low-pressure turbochargers 92, 94, respectively. Exhaust streams entering first and second low-pressure turbochargers 92, 94 may propel first and second low-pressure turbines 112, 122, respectively, which in turn my drive first and second low-pressure compressors 114, 124, respectively.

Referring to FIG. 3, exhaust may exit first and second low-pressure turbines 112, 122 via first and second outlets 208, 210 and enter into mixing ducts 212, 214. Mixing ducts 212, 214 may direct the exhaust to after-treatment systems 34, 35, respectively, where the exhaust may be treated by DOC 162 and DPF 164. After being treated in after-treatment systems 34, 35, the exhaust may be released to the ambient via outlets 220, 222, respectively.

Referring to FIG. 6, exhaust may exit first and second low-pressure turbines 112, 122 and may merge into a single exhaust stream via adapter 262. The merged exhaust stream may pass through duct 266, which may direct the exhaust to after-treatment system 254, where the exhaust may be treated by DOC 162 and DPF 164. After being treated in after-treatment system 254, the exhaust may be released to the ambient.

It will be apparent to those skilled in the art that various modifications and variations can be made to the disclosed engine system. Other embodiments will be apparent to those skilled in the art from consideration of the specification and practice of the disclosed engine system. It is intended that the specification and examples be considered as exemplary only, with a true scope being indicated by the following claims and their equivalents.

What is claimed is:

1. An engine system, comprising:
   an engine having an accessory end and a drive end opposite the accessory end;
   a turbocharger arrangement located adjacent the accessory end, the turbocharger arrangement being configured to receive exhaust from the engine and deliver compressed air for combustion in the engine;
   an air cooling arrangement located adjacent the accessory end, the air cooling arrangement being configured to receive the compressed air from the turbocharger arrangement, cool the compressed air, and deliver the compressed air to the engine;
   a mixing duct extending from the accessory end to the drive end and configured to receive the exhaust from the turbocharger arrangement; and
   an after-treatment system located adjacent the drive end, the after-treatment system being configured to receive the exhaust from the mixing duct, treat the exhaust, and discharge the exhaust to an ambient, wherein:
   the engine includes an exhaust manifold configured to receive the exhaust from the engine and deliver the exhaust to the turbocharger arrangement; and
   the exhaust manifold is located at a first gravitationally lower position than the mixing duct.

2. The engine system of claim 1, wherein the air cooling arrangement is located at a gravitationally lower position than the turbocharger arrangement.

3. The engine system of claim 1, wherein:
   the engine includes an intake manifold configured to receive the compressed air from the air cooling arrangement and deliver the compressed air to the engine; and
   the intake manifold is located at a second gravitationally lower position than the exhaust manifold.

4. The engine system of claim 3, wherein the turbocharger arrangement includes:
   at least one high-pressure turbocharger, including:
   a high-pressure turbine; and
   a high-pressure compressor; and
   at least one low-pressure turbocharger, including:
   a low-pressure turbine; and
   a low-pressure compressor.

5. The engine system of claim 4, wherein the air cooling arrangement includes:
   a first cooler configured to receive the compressed air from the low-pressure compressor and deliver chilled air to the high-pressure compressor; and a second cooler configured to receive the compressed air from the high-pressure compressor and deliver the chilled air to the intake manifold.

6. The engine system of claim 5, wherein the air cooling arrangement includes:
an outlet located at an upper wall of the air cooling arrangement;
a compact duct configured to deliver air from the first cooler to the high-pressure compressor via the outlet;
an inlet located at the upper wall and configured to receive the air from the high-pressure compressor; and
a passageway fluidly connected to the inlet and configured to deliver the air to the second cooler.

7. The engine system of claim 4, wherein:
the at least one low-pressure turbocharger is a first low-pressure turbocharger;
the engine system includes a second low-pressure turbocharger; and
the first and the second low-pressure turbochargers are located at a gravitationally higher position than the at least one high-pressure turbocharger.

8. The engine system of claim 7, wherein the first low-pressure turbocharger, the second low-pressure turbocharger, and the at least one high-pressure turbocharger are attached to a support structure connected to the engine.

9. The engine system of claim 7, wherein the first low-pressure turbocharger and the second low-pressure turbocharger are located on either side of the at least one high-pressure turbocharger.

10. The engine system of claim 7, wherein high-pressure turbocharger, the first low-pressure turbocharger, and the second low-pressure turbocharger are about equal in size.

11. The engine system of claim 7, wherein the at least one high-pressure turbocharger is configured to receive the exhaust from the exhaust manifold and the engine system further includes an elbow configured to:
receive the exhaust from the at least one high-pressure turbocharger;
divide the exhaust into two exhaust flows; and
direct the two exhaust flows to the first low-pressure turbocharger and the second low pressure turbocharger.

12. The engine system of claim 11, wherein the mixing duct includes:
a duct fluidly connecting the turbocharger arrangement and the after-treatment system; and
an adapter configured to receive the two exhaust flows from the first and the second low-pressure turbochargers and deliver a mixed exhaust flow to the duct.

13. The engine system of claim 1, further including a transition duct configured to deliver the exhaust from the mixing duct to the after-treatment system.

14. The engine system of claim 1, further including:
an exhaust gas recirculation arrangement configured to direct a portion of exhaust from the engine to an intake manifold; and
at least one control valve located in the exhaust gas recirculation arrangement to control the portion of exhaust.

15. The engine system of claim 1, further including:
a passageway configured to direct a portion of the exhaust from the engine to the mixing duct; and
a control valve located in the passageway and configured to selectively control the portion of the exhaust.

16. The engine system of claim 15, further including a coolant duct located near the control valve and configured to cool the control valve using coolant from the engine.

17. The engine system of claim 1, further including:
a support structure;
a cantilevered frame attached to the support structure and configured to support the after-treatment system located above the engine; and
support members connecting the cantilevered frame to the engine.

18. The engine system of claim 17, further including an alternator structure disposed at the drive end of the engine, wherein the after-treatment system is located above and connected to the alternator structure.

\* \* \* \* \*